United States Patent
Obrokta et al.

(10) Patent No.: US 9,818,163 B2
(45) Date of Patent: Nov. 14, 2017

(54) PROPERTY MANAGEMENT SYSTEM

(71) Applicant: National Property Solutions Group, LLC, Atlanta, GA (US)

(72) Inventors: Eric Obrokta, Kissimmee, FL (US); William T. Selby, Atlanta, GA (US)

(73) Assignee: NATIONAL PROPERTY SOLUTIONS GROUP, LLC, Kennesaw, GA (US)

( * ) Notice: Subject to any disclaimer, the term of this patent is extended or adjusted under 35 U.S.C. 154(b) by 715 days.

(21) Appl. No.: 14/212,298

(22) Filed: Mar. 14, 2014

(65) Prior Publication Data
US 2014/0279594 A1   Sep. 18, 2014

Related U.S. Application Data

(60) Provisional application No. 61/785,553, filed on Mar. 14, 2013.

(51) Int. Cl.
*G06Q 50/16*   (2012.01)

(52) U.S. Cl.
CPC .................................. *G06Q 50/163* (2013.01)

(58) Field of Classification Search
None
See application file for complete search history.

(56) References Cited

U.S. PATENT DOCUMENTS

| | | | |
|---|---|---|---|
| 7,580,862 B1* | 8/2009 | Montelo | G06Q 10/10 705/26.1 |
| 2006/0217114 A1* | 9/2006 | Chen | H04W 24/00 455/423 |
| 2012/0330852 A1* | 12/2012 | Kochevar | G06Q 10/20 705/317 |
| 2014/0229874 A1* | 8/2014 | Strauss | G06Q 50/08 715/771 |

\* cited by examiner

*Primary Examiner* — Robert E Niquette
*Assistant Examiner* — Joseph W King
(74) *Attorney, Agent, or Firm* — Nixon & Vanderhye P.C.

(57) ABSTRACT

A computerized property management system enables users to input a service request by placing a problem-type icon on a floor plan and designating a priority or urgency for the service request. The user can select a problem type note and/or input text describing the problem. Additionally, the user can add photographs, voice notes or video. After the service request is submitted, a contractor is notified of the request by email or text, which includes a link to the service request page with the information entered by the user. After the service request task is completed, the contractor can add notes describing what was fixed and indicating that the task has been completed. Subsequently, an email or other communication may be sent to the property manager and the requestor to indicate that the task has been completed.

11 Claims, 10 Drawing Sheets

NPSG | NATIONAL PROPERTY SOLUTIONS GROUP

Expand Menu ▼

Click here to logout.

Service Requests

To submit a service request, please select a floor plan below.

| Title/Floor | Building | Tools |
|---|---|---|
| Lenox south Tower 14th Floor | Lenox Towers | Click here to add a service request |
| Lenox south Tower 2nd Floor | Lenox Towers | Click here to add a service request |
| Lenox south Tower 3rd Floor | Lenox Towers | Click here to add a service request |
| Lenox south Tower 7th Floor | Lenox Towers | Click here to add a service request |
| Suite 1100 | Lenox Towers | Click here to add a service request |

PROPERTY MANAGEMENT SYSTEM

CROSS-REFERENCES TO RELATED APPLICATIONS

This application claims the benefit of U.S. Provisional Patent Application No. 61/785,553, filed Mar. 14, 2013, the entire content of which is herein incorporated by reference.

STATEMENT REGARDING FEDERALLY SPONSORED RESEARCH OR DEVELOPMENT (NOT APPLICABLE)

BACKGROUND OF THE INVENTION

The invention relates to a computer system for property management.

Property management is an exercise in persistence and organization. Large properties in particular with many tenants/users and/or encompassing large square footage can experience a multitude of property management issues with varying priority/urgency levels. For example, a misaligned door jamb can be assigned a regular priority, whereas a leaking pipe may require immediate attention. Compound these types of problems over hundreds of units, and management can become a difficult task.

Other hurdles encountered by property managers may include communication to and from contractors, scheduling communications to tenants/users, and the like.

It would be desirable for a computerized management system to facilitate property management tasks and to address persistent problems with existing property management techniques and procedures.

SUMMARY OF THE INVENTION

The property management system of the invention facilitates property management tasks for a property manager and facilitates reporting protocols for tenants and users. The system utilizes floor plans and problem type icons so that problem types and locations can be easily identified. Once a problem has been identified, pre-established communication protocols notify all relevant parties to address the particular concern. The system is also well-suited for managing construction projects including punch out lists and the like, and scheduling.

In an exemplary embodiment, a computerized property management system enables users to input a service request by placing a problem-type icon on a floor plan and designating a priority or urgency for the service request. The user can select a problem type note and/or input text describing the problem. Additionally, the user may add photographs, voice notes or video. After the service request is submitted, a contractor may be notified of the request by email or text, which includes a link to the service request page with the information entered by the user. After the service request task is completed, the contractor may add notes describing what was fixed and indicating that the task has been completed. Subsequently, an email or other communication may be sent to the property manager and the requestor to indicate that the task has been completed.

BRIEF DESCRIPTION OF THE DRAWINGS

FIG. 1 is a screen shot showing exemplary properties/floor plans in a property management system;

FIG. 5 shows service technician notes regarding a repair;

FIG. 9 shows an exemplary inventory entry for the inventory management application.

DETAILED DESCRIPTION OF THE INVENTION

Figure 2:
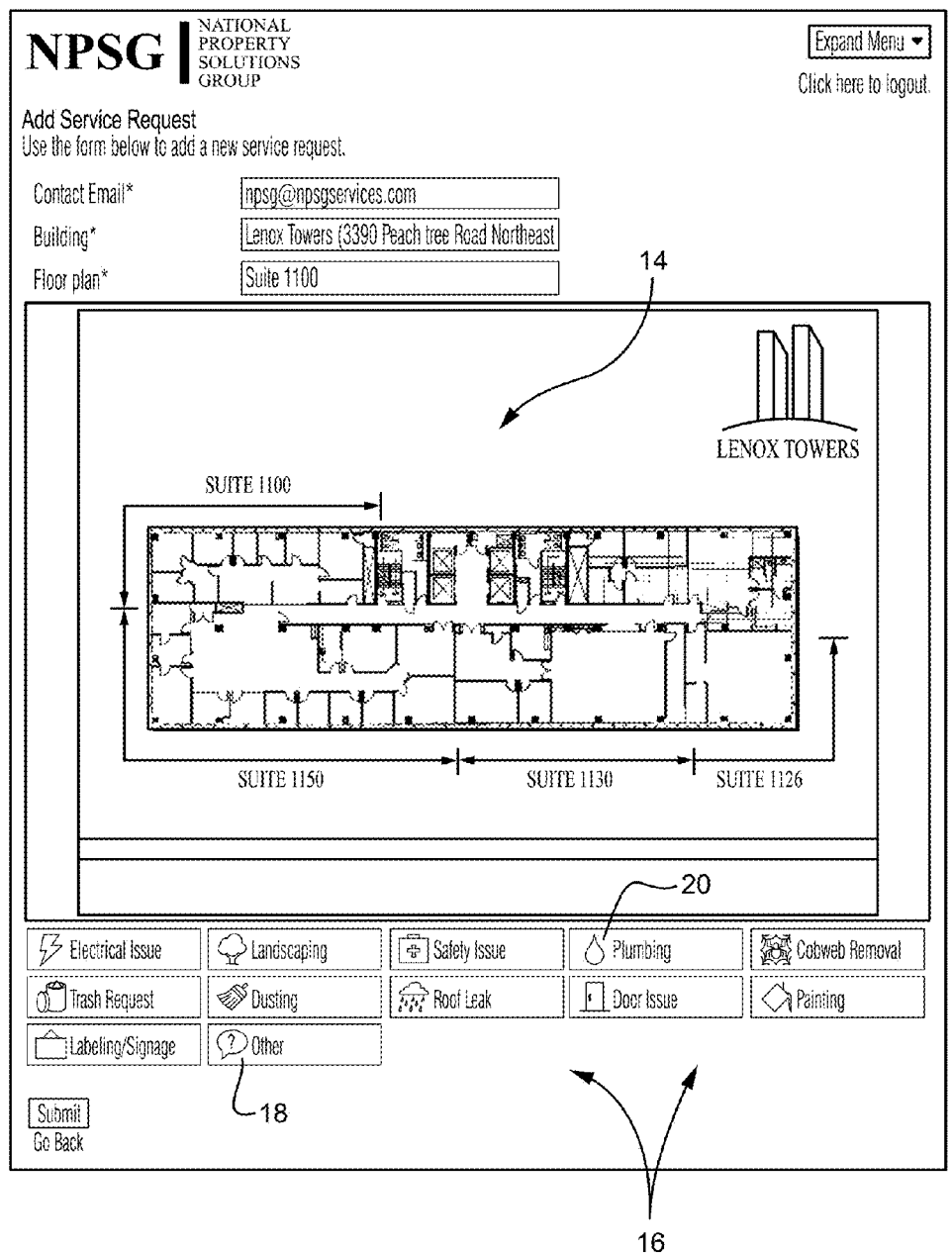
FIG. 2 is an exemplary floor plan selected by a user.

By way of example, the system will be described in the context of an office building. It will be appreciated that the system is equally applicable to residential apartments, warehouses, etc. In the example, a tenant or user has discovered a faucet with a slow leak and draining problems. With reference to the drawings, the user accesses the system via the Internet and logs in using a user name and password. With reference to FIG. 1, the user is prompted to select a floor plan from a list of floor plans 12 accessible to the user or managed by the property manager or the like. Once the floor plan is selected, the selected floor plan 14 is displayed to the user (see FIG. 2). As shown, the display includes a plurality of icons 16 that are representative of particular issues or problems that may arise in the property. The user selects a particular icon or the problem type. If the problem type is not represented, the user can select the "Other" icon 18.

Figure 3:
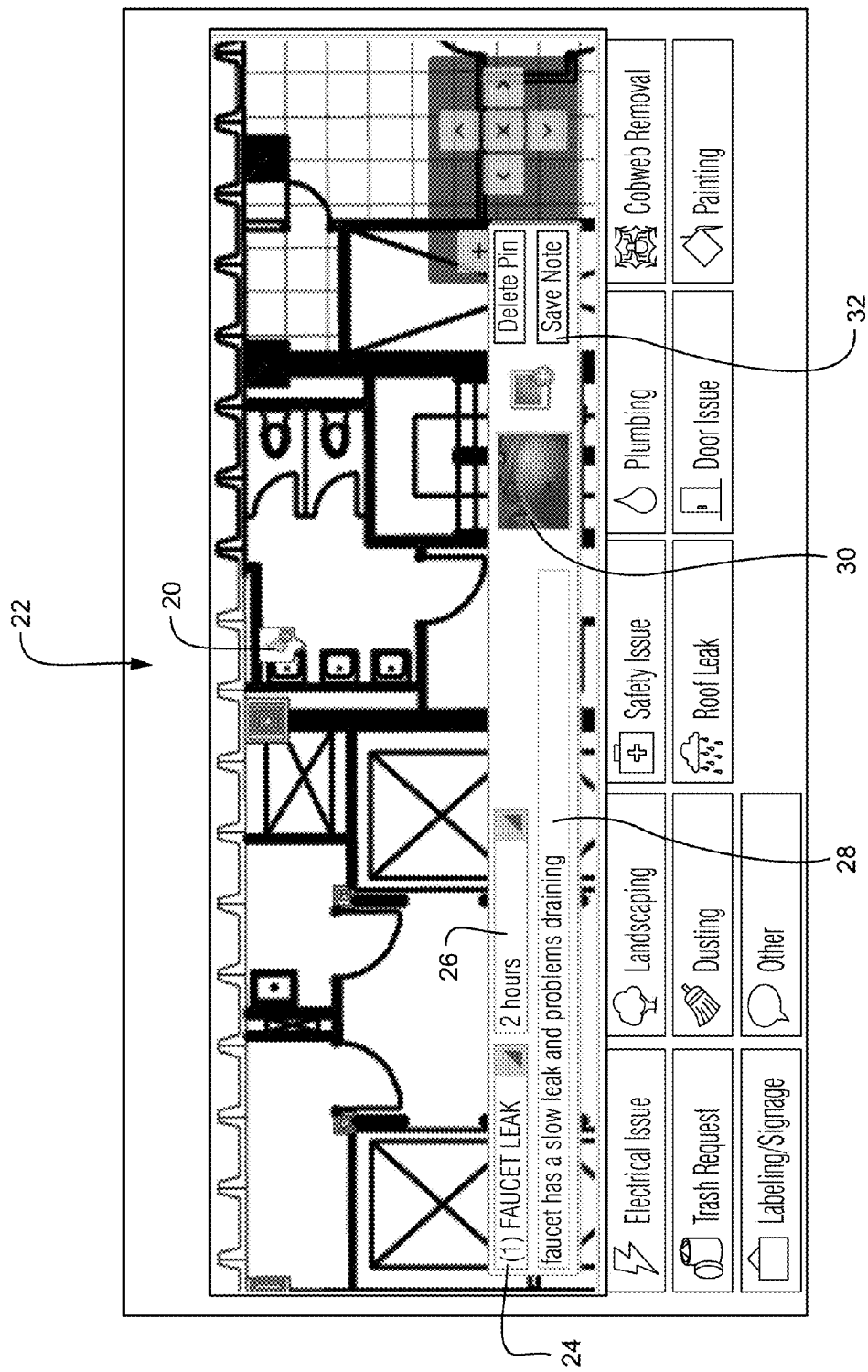
FIG. 3 is a close-up view of an area of the floor plan selected by the user.

In the described example, the user selects the plumbing icon 20. The user then selects an area 22 of the plan where the issue resides, and the icon 20 is placed on the floor plan (see FIG. 3). After placing the icon, the user is prompted to select a preset note 24 from a drop-down menu or the like ("(1) faucet leak" selected in FIG. 3). The user also can select a priority time frame 26 in which the problem should be addressed. Certain priority time frames may be automatically selected depending on the preset note selected. For example, for a faucet leak, this is considered a high priority item, and a two-hour window is selected for immediate repair. A notes window 28 also includes an area where the user can input text describing the issue to be resolved ("faucet has a slow leak and problems draining"), and the user can attach a picture, voice file or video 30 to the note. When the note entries are complete, the user selects the "save note" button 32. The user can add further notes, voice notes, photos or the like and subsequently "submit" the service request.

Figure 4:
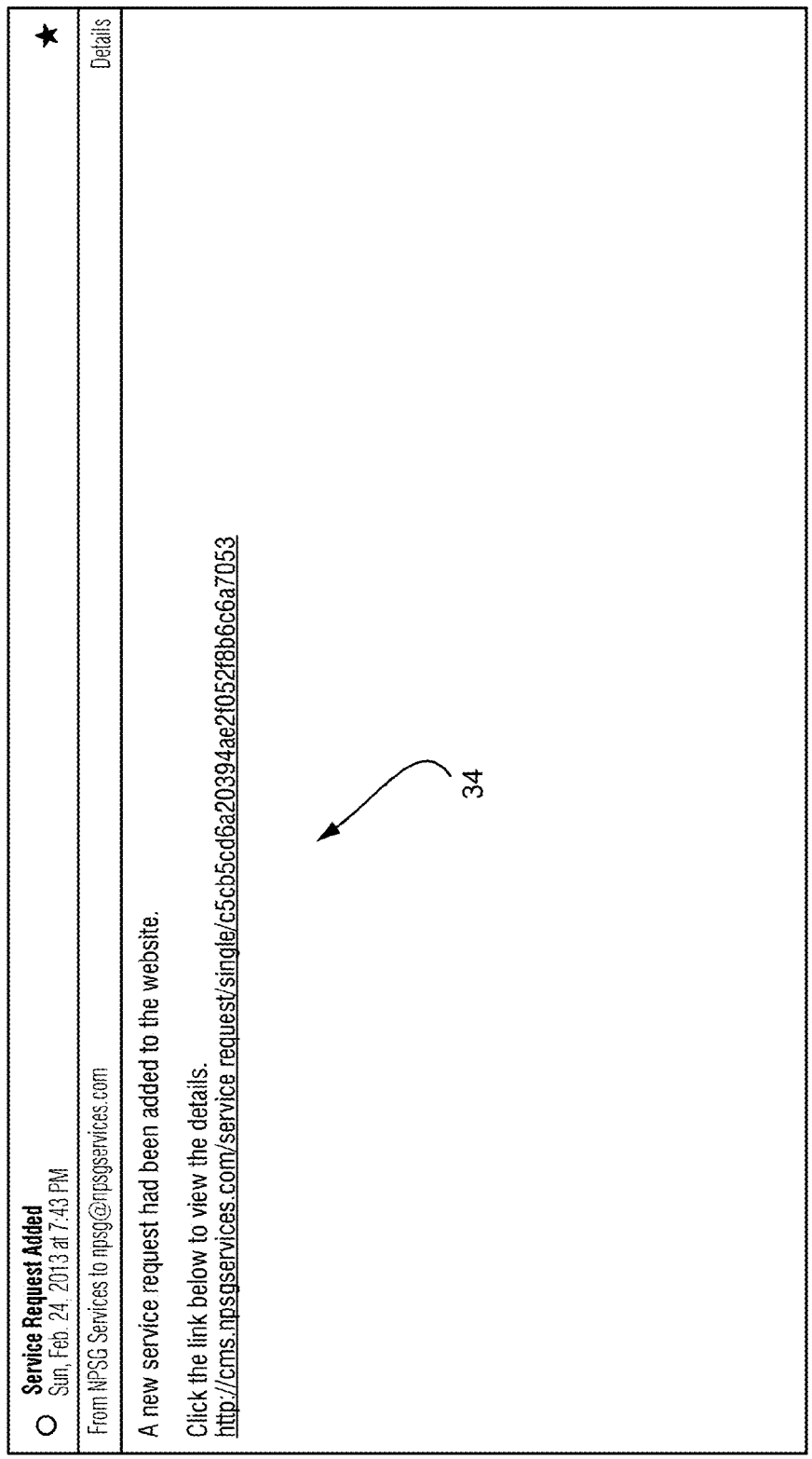
FIG. 4 is a screen shot of a service request notice.

When the service request has been submitted, the user receives an email 34 that the service request has been added to the website (see FIG. 4). All other assigned parties receive email and/or a text message informing them of the new service request. In the example service request, an email is sent to the property manager and to an on-site or contracted plumbing contractor. The email or text to the contractor includes a link to the floor plan showing the service request and location.

Figure 5:
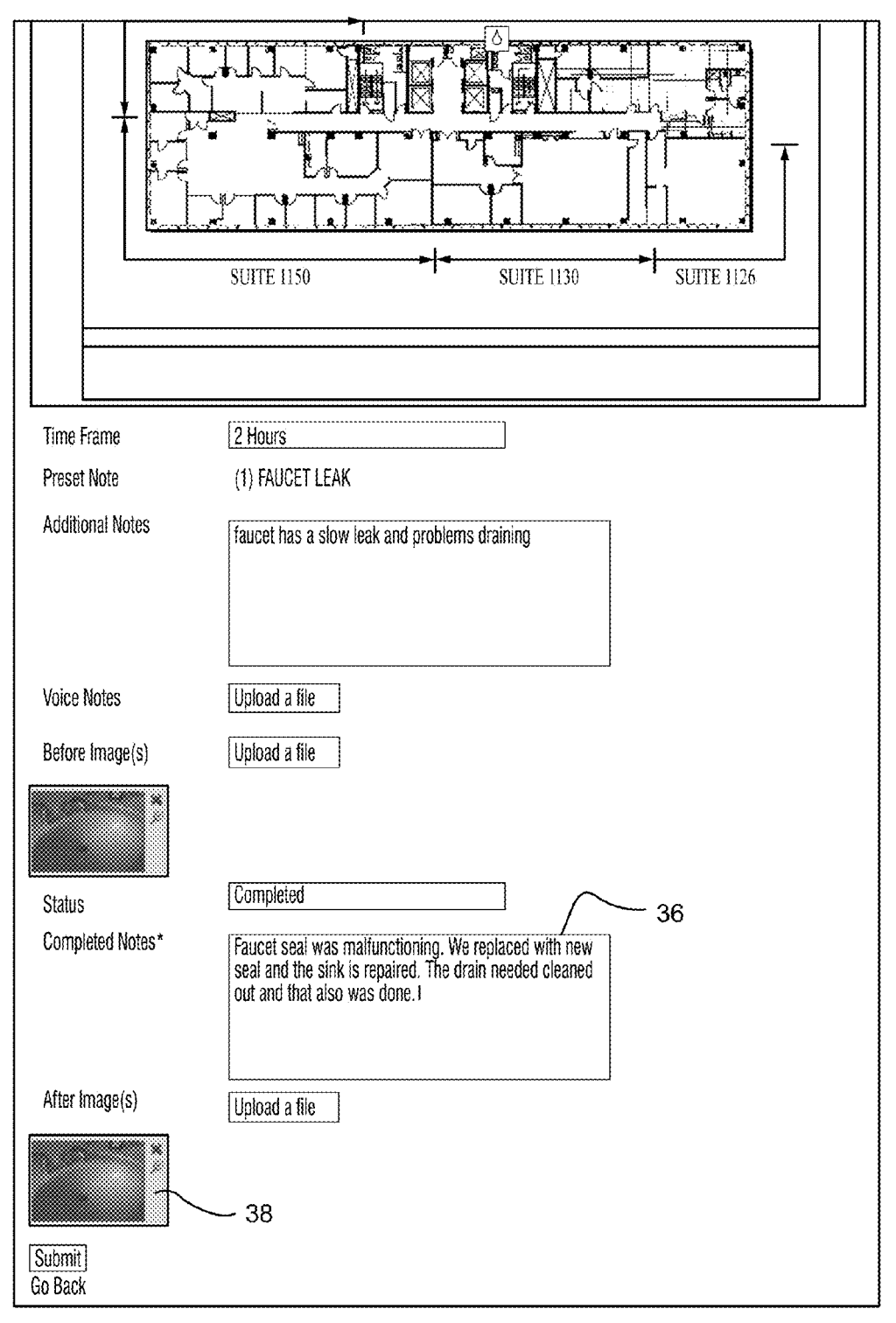
Figure 6:
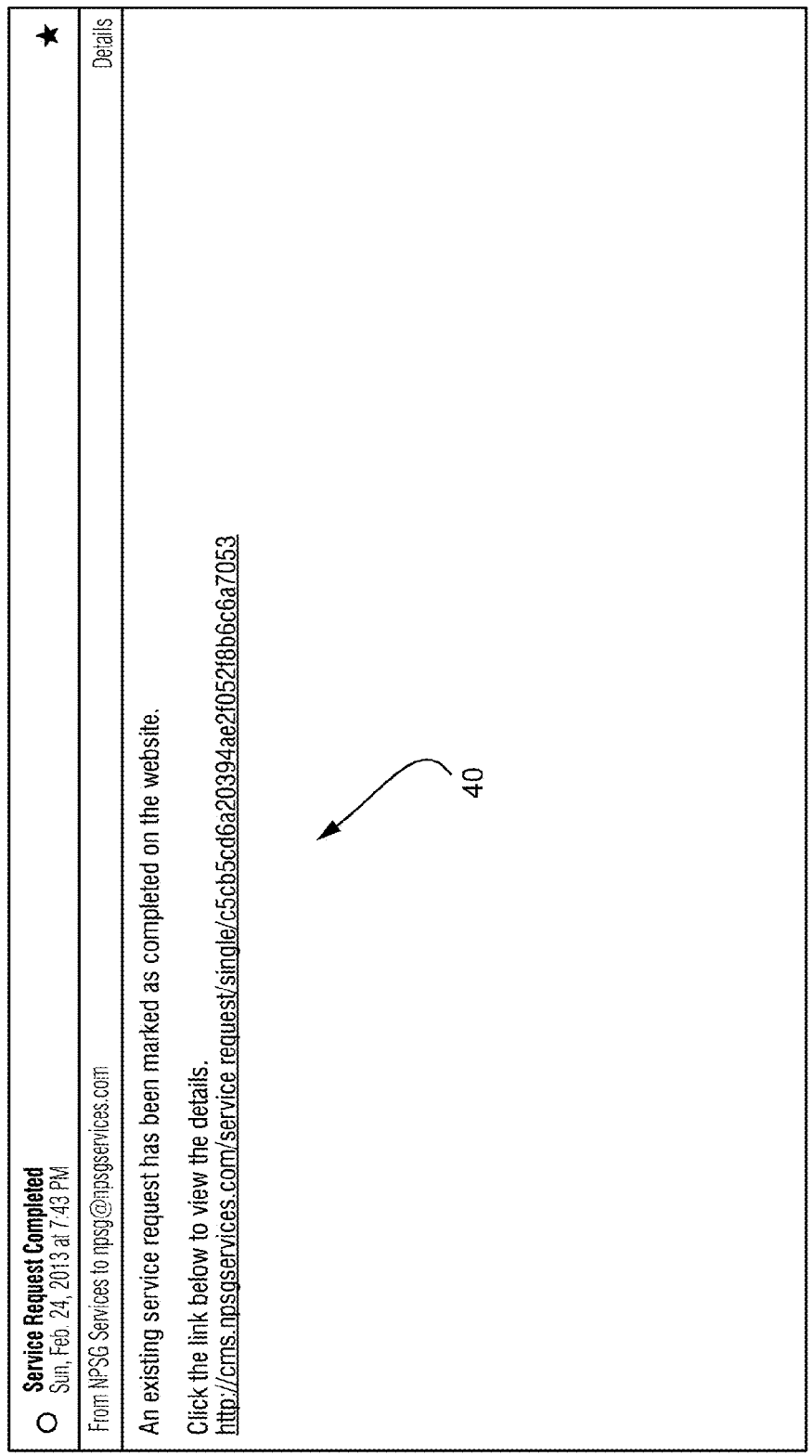
FIG. 6 is a screen shot of a note indicating that the service request has been completed.

After the problem has been addressed, with reference to FIG. 5, the contractor can input notes 36 regarding repair and indicate that the repair has been completed. The contractor can also attach photographs, voice notes or video 38, and the completed service request is submitted. Subsequently, all parties receive an email or text 40 informing them that the service request has been marked as completed on the website (see FIG. 6).

Figure 7:
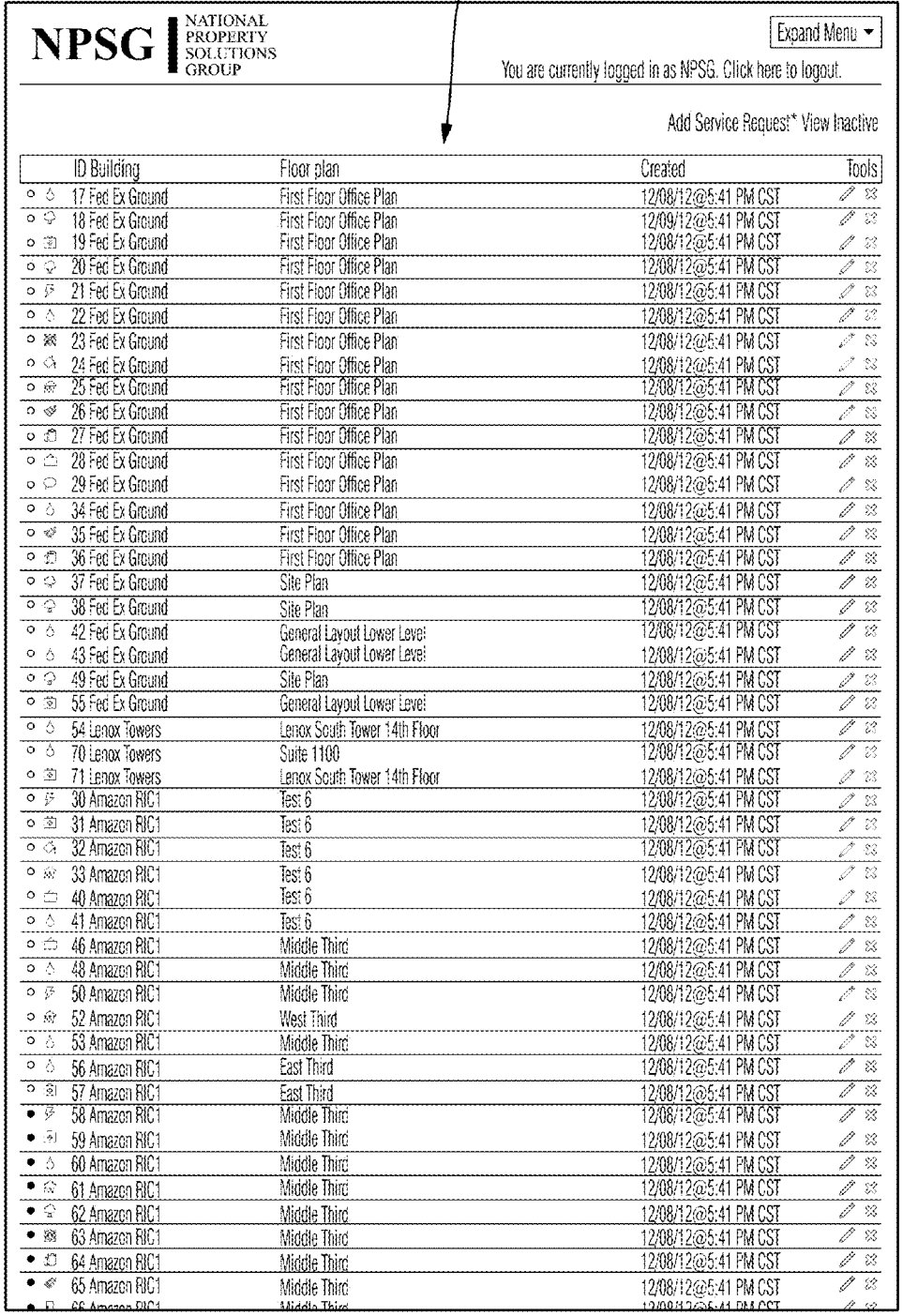
FIG. 7 is an exemplary summary page of all service requests.

Certain parties with administrative rights are able to access a summary page of all service requests 42, both open and completed (see FIG. 7). The administrator can monitor service requests with information including, for example:
  status icon (red-open, green-completed)
  service request type (indicated by icon)
  ID number (based on order of the input into system)
  building code
  floor plan code
  date and time service request created
  edit icon
  delete/move icon From this page, the administrator also has the ability to add service requests or view inactive requests via links or the like.

The system is also well-suited for construction projects including, for example, construction punch out lists. An architect or building inspector can use icons and priority designations in a post-construction inspection to identify punch out items requiring attention. Depending on problem type, an appropriate sub-contractor is notified as well as a property manager.

Additionally, the system can be used for scheduling, for example, in the context of landscape services or the like. In this example, icons can be placed on a landscape plan, aerial photo or the like for mowing or weed removal. A priority designation can be set as "weekly" or "monthly" etc., and an email reminder would be sent to the landscape contractor every week or month, a preset time before the scheduled service date.

Figure 8:
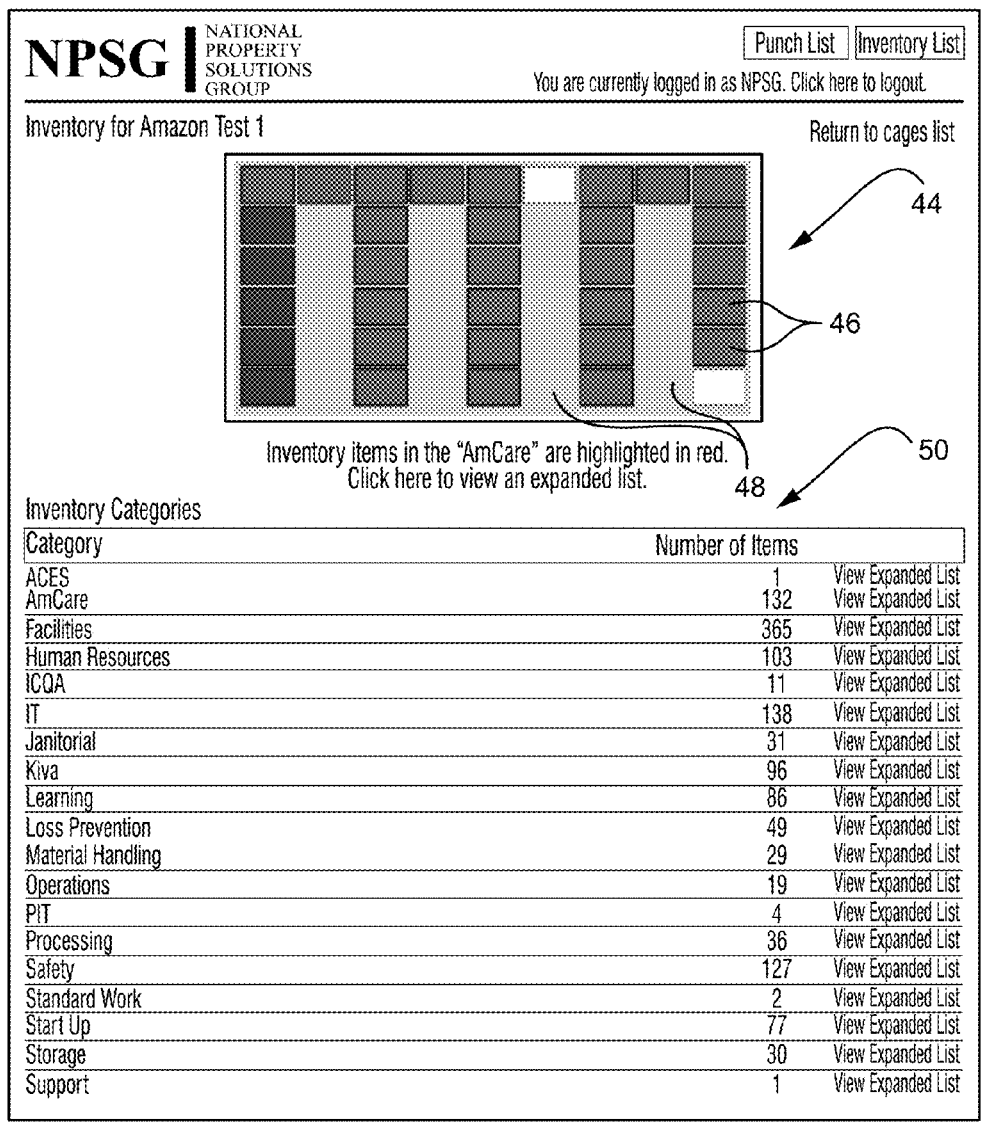
FIG. 8 is a screen shot showing an application to inventory management.

Yet another application relates to inventory management. Prior to setup, the user provides the system with an inventory order list, which is uploaded into the system. The user logs into the system and selects Inventory List button. The user selects Create New Cage and enters a name for the inventory cage. The user enters length and width dimensions of the inventory cage. The space is measured by pallets, which is a standard unit of warehouse storage. If the inventory cage will be nine (9) pallets deep by six (6) pallets wide, the user would enter length of 9 and width of 6. After selecting the Submit button, the user is taken to an inventory cage list and selects the pencil icon to edit the cage. The user will see a cage 44 with a 9×6 grid of 2-dimensional squares 46 and can select squares, or pallets, to remove to create walkway areas 48. See FIG. 8. After choosing pallets to remove, the user selects Submit and is taken back to the inventory cage list.

As inventory is received, the user identifies the appropriate category 50 and clicks View Expanded List for that category. The user is taken to the Expanded List page 52 and clicks on the item being received. The user enters the date received and quantity and selects the appropriate pallet(s) for storage and selects Update 54. See FIG. 9.

Figure 9:
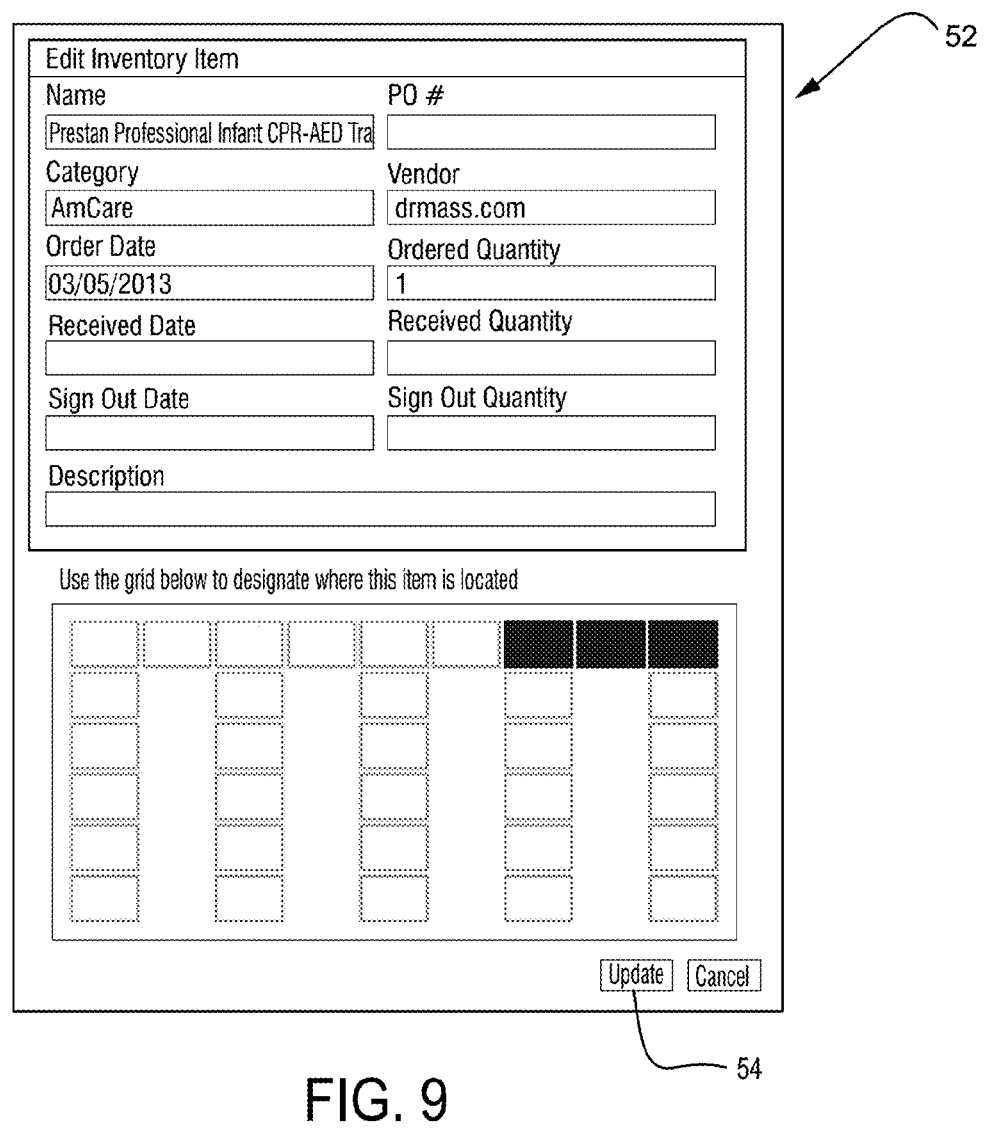

As inventory is needed, the user identifies the appropriate category and clicks View Expanded List for that category. The user is taken to the Expanded List page 52 and clicks on the item being removed. The user enters the date taken and quantity and selects the appropriate pallet(s) for removal. The user then selects Update 54 (FIG. 9).

The property management system described with reference to FIGS. 1-9 is preferably a browser-based system in which a program running on a user's computer (the user's web browser) requests information from a server program running on a system server. The system server sends the requested data back to the browser program, and the browser program then interprets and displays the data on the user's computer screen. The process is as follows:

1. The user runs a web browser program on his/her computer.
2. The user connects to the server computer (e.g., via the Internet). Connection to the server computer may be conditioned upon the correct entry of a password as is well known.
3. The user requests a page from the server computer. The user's browser sends a message to the server computer that includes the following:
  the transfer protocol (e.g., http://); and
  the address, or Uniform Resource Locator (URL).
4. The server computer receives the user's request and retrieves the requested page, which is composed, for example, in HTML (Hypertext Markup Language).
5. The server then transmits the requested page to the user's computer.
6. The user's browser program receives the HTML text and displays its interpretation of the requested page.

Thus, the browser program on the user's computer sends requests and receives the data needed to display the HTML page on the user's computer screen. This includes the HTML file itself plus any graphic, sound and/or video files mentioned in it. Once the data is retrieved, the browser formats the data and displays the data on the user's computer screen. Helper applications, plug-ins, and enhancements such as Java™ enable the browser, among other things, to play sound and/or display video inserted in the HTML file. The fonts installed on the user's computer and the display preferences in the browser used by the user determine how the text is formatted.

If the user has requested an action that requires running a program (e.g., a search), the server loads and runs the program. This process usually creates a custom HTML page "on the fly" that contains the results of the program's action (e.g., the search results), and then sends those results back to the browser.

Browser programs suitable for use in connection with the property management system of the present invention include Firefox® available from Mozilla® and Internet Explorer available from Microsoft® Corp.

While the above description contemplates that each user has a computer running a web browser, it will be appreciated that more than one user could use a particular computer terminal or that a "kiosk" at a central location (e.g., a cafeteria, a break area, etc.) with access to the system server could be provided.

It will be recognized by those in the art that various tools are readily available to create web pages for accessing data stored on a server and that such tools may be used to develop and implement the property management system described above and illustrated in the accompanying drawings.

Figure 10:
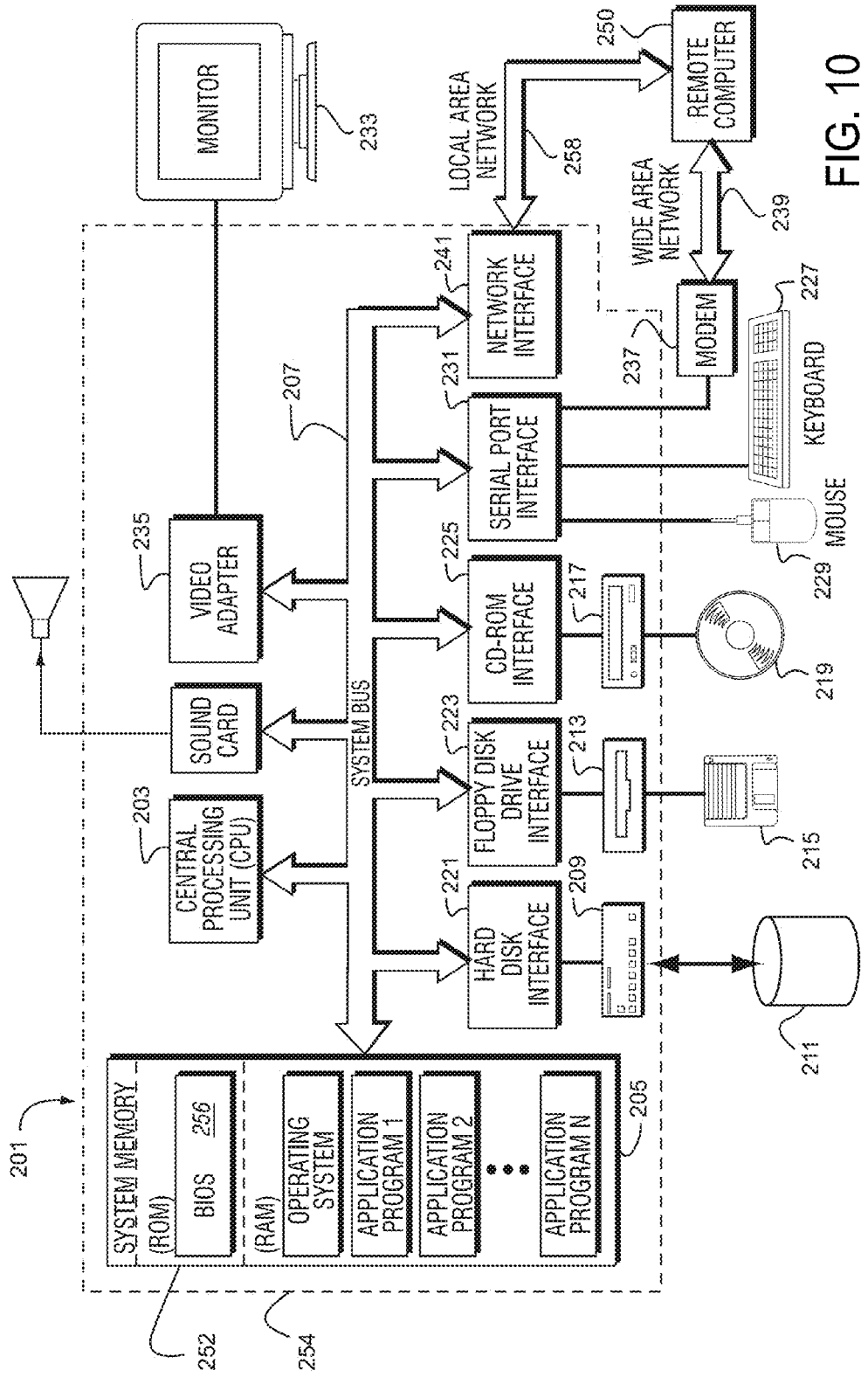
FIG. 10 is a detailed schematic of a computer system.

FIG. 10 generally illustrates a computer system 201 suitable for use as the client and server components of the property management system. It will be appreciated that the client and server computers will run appropriate software and that the client and server computers may be somewhat differently configured with respect to the processing power of their respective processors and with respect to the amount of memory used. Computer system 201 includes a processing unit 203 and a system memory 205. A system bus 207 couples various system components including system memory 205 to processing unit 203. System bus 207 may be any of several types of bus structures including a memory bus or memory controller, a peripheral bus, and a local bus using any of a variety of bus architectures. System memory 205 includes read only memory (ROM) 252 and random access memory (RAM) 254. A basic input/output system (BIOS) 256, containing the basic routines that help to transfer information between elements within computer system 201, such as during start-up, is stored in ROM 252. Computer system 201 further includes various drives and associated computer-readable media. A hard disk drive 209 reads from and writes to a (typically fixed) magnetic hard disk 211; a magnetic disk drive 213 reads from and writes to a removable "floppy" or other magnetic disk 215; and an optical disk drive 217 reads from and, in some configurations, writes to a removable optical disk 219 such as a CD ROM or other optical media. Hard disk drive 209, magnetic disk drive 213, and optical disk drive 217 are connected to system bus 207 by a hard disk drive interface 221, a magnetic disk drive interface 223, and an optical drive interface 225, respectively. The drives and their associated computer-readable media provide nonvolatile storage of computer-readable instructions, SQL-based procedures, data structures, program modules, and other data for computer system 201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules may be stored on the hard disk 211, removable magnetic disk 215, optical disk 219 and/or ROM 252 and/or RAM 254 of the system memory 205. Such program modules may include an operating system providing graphics and sound APIs, one or more application programs, other program modules, and program data. A user may enter commands and information into computer system 201 through input devices such as a keyboard 227 and a pointing device 229. Other input devices may include a microphone, joystick, game controller, satellite dish, scanner, or the like. These and other input devices are often connected to the processing unit 203 through a serial port interface 231 that is coupled to the system bus 207, but may be connected by other interfaces, such as a parallel port interface or a universal serial bus (USB). A monitor 233 or other type of display device is also connected to system bus 207 via an interface, such as a video adapter 235.

The computer system 201 may also include a modem 237 or other means for establishing communications over the wide area network 239, such as the Internet. The modem 237, which may be internal or external, is connected to the system bus 207 via the serial port interface 231. A network interface 241 may also be provided for allowing the computer system 201 to communicate with a remote computing device 250 via a local area network 258 (or such communication may be via the wide area network 239 or other communications path such as dial-up or other communications means). The computer system 201 will typically include other peripheral output devices, such as printers and other standard peripheral devices.

As will be understood by those familiar with web-based forms and screens, users may make menu selections by pointing-and-clicking using a mouse, trackball or other pointing device, or by using the TAB and ENTER keys on a keyboard. For example, menu selections may be highlighted by positioning the cursor on the selections using a mouse or by using the TAB key. The mouse may be left-clicked to select the selection or the ENTER key may be pressed. Other selection mechanisms including voice-recognition systems, touch-sensitive screens, etc. may be used, and the invention is not limited in this respect.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A computerized method for property management, the method comprising:
   (a) providing by a system server a website accessible by a user, the website listing managed properties;
   (b) the system server being programmed to permit the user to select on the website one of the managed properties;
   (c) displaying a floor plan of the selected managed property on the website;
   (d) displaying icons representative of particular issues or problems on the website;
   (e) the system server being programmed to permit the user to select on the website one of the icons corresponding to an issue or problem of the particular issues or problems, and to permit the user to select on the website an area of the floor plan where the selected issue or problem is occurring, wherein when the user selects the one of the icons and associated area of the floor plan, such selecting by the user constitutes and automatically generates a service request;
   (f) the system server being programmed to permit the user to input content on the website about the selected issue or problem; and
   (g) processing the generated service request by automatically: (g1) sending an alert message to a service technician to address the selected issue or problem, wherein the alert message comprises an email or text message to the service technician, and wherein the email or text message includes a link to the floor plan showing the service request, (g2) sending an alert to a property manager, and (g3) sending an alert to the user when the service request has been resolved.

2. A method according to claim 1, wherein step (g) further comprises programming the system server to permit the service technician to indicate that the service request has been completed.

3. A method according to claim 2, wherein step (g) further comprises programming the system server to permit the service technician to input content about the service request.

4. A method according to claim 1, wherein after step (e), the method comprises graphically displaying the selected icon on the floor plan at the selected area of the floor plan where the selected issue or problem is occurring.

5. A method according to claim 1, wherein step (f) further comprises displaying preset notes from a drop-down menu for selection by the user.

6. A method according to claim 1, wherein step (f) further comprises programming the system server to permit the user to input a text description of the selected issue or problem.

7. A method according to claim 1, wherein step (f) further comprises receiving an image input by the user relating to the selected issue or problem.

8. A method according to claim 1, wherein step (e) further comprises displaying priority time frames for selection by the user.

9. A method according to claim 1, wherein step (e) further comprises automatically assigning a priority time frame based on the selected issue or problem.

10. A method according to claim 1, wherein step (g) further comprises defining a recurring service request.

11. A computer system for property management, the computer system comprising:
   at least one user computer running a computer program that requests information according to a selected managed property; and
   a system server running a server program, the at least one user computer and the system server being interconnected by a computer network, the system server providing a website accessible by a user, the system server displaying a floor plan of the selected managed property on the website, displaying icons representative of particular issues or problems on the website, and being programmed to permit the user to select on the website, with the at least one user computer, one of the icons corresponding to an issue or problem of the particular issues or problems, the server program including code that permits a user to select on the website an area of the floor plan where the selected issue or problem is occurring, the server being programmed to automatically assign a priority time frame based on the selected issue or problem, wherein when the user selects the one of the icons and associated area of the floor plan, such selecting by the user together with the automatic assigning of the priority time frame constitutes and automatically generates a service request, the system server also being programmed to permit the user to input content on the website about the selected issue or problem, and the system server processing the service request.

* * * * *